(12) United States Patent
Kim

(10) Patent No.: US 9,611,632 B2
(45) Date of Patent: Apr. 4, 2017

(54) TOILET CONTROLS

(71) Applicant: AQUA MIZER, INC., Sarasota, FL (US)

(72) Inventor: Jonathan S. Kim, Sarasota, FL (US)

(73) Assignee: Aqua Mizer, Inc., Sarasota, KS (US)

( * ) Notice: Subject to any disclaimer, the term of this patent is extended or adjusted under 35 U.S.C. 154(b) by 273 days.

(21) Appl. No.: 14/475,880

(22) Filed: Sep. 3, 2014

(65) Prior Publication Data

US 2015/0074894 A1    Mar. 19, 2015

Related U.S. Application Data

(60) Provisional application No. 61/873,072, filed on Sep. 3, 2013.

(51) Int. Cl.
| | |
|---|---|
| *E03D 1/33* | (2006.01) |
| *E03D 1/32* | (2006.01) |
| *E03D 5/092* | (2006.01) |
| *E03D 1/00* | (2006.01) |
| *F16K 33/00* | (2006.01) |
| *E03D 1/30* | (2006.01) |
| *E03D 1/36* | (2006.01) |

(52) U.S. Cl.
CPC ............... *E03D 1/32* (2013.01); *E03D 1/00* (2013.01); *E03D 1/308* (2013.01); *E03D 1/33* (2013.01); *E03D 1/36* (2013.01); *E03D 5/092* (2013.01); *F16K 33/00* (2013.01)

(58) Field of Classification Search
CPC .... E03D 1/22; E03D 1/32–1/36; E03D 1/304; E03D 1/308; E03D 1/00; E03D 5/09; E03D 5/092; E03D 5/094; F16K 33/00; F16K 31/18; F16K 31/20; F16K 31/22; F16K 31/28
USPC ............ 4/363, 366–368, 395, 405, 411–415; 137/400, 409, 410, 423, 428
See application file for complete search history.

(56) References Cited

U.S. PATENT DOCUMENTS

| | | |
|---|---|---|
| 3,574,867 A | 4/1971 | Biniores |
| 5,421,038 A | 6/1995 | Zamudio-Castillo et al. |
| 5,524,299 A * | 6/1996 | Dalfino ..................... E03D 1/00 137/410 |
| 5,862,537 A | 1/1999 | Osmond |
| 6,109,294 A | 8/2000 | Ray et al. |
| 6,427,719 B1 | 8/2002 | Rodriguez |
| 8,707,474 B2 | 4/2014 | Rachwal |
| 2001/0007158 A1 | 7/2001 | Hubatka et al. |
| 2004/0199989 A1 | 10/2004 | Trolio |
| 2012/0318382 A1 * | 12/2012 | Magar ....................... E03D 1/00 137/409 |

* cited by examiner

*Primary Examiner* — J. Casimer Jacyna
(74) *Attorney, Agent, or Firm* — Tarolli, Sundheim, Covell & Tummino LLP

(57) ABSTRACT

Controls for use in association with the main tank of a toilet include a container which is disposed in the main tank and holds a body of water. A float is movable in the container to expel water from the container and effect operation of an inlet valve from a closed condition to an open condition. Water flows into an inlet compartment and into the main tank when the inlet valve is in the open condition. Water flows into an outlet compartment after a predetermined quantity of water has accumulated in the inlet compartment. Water flows from the outlet compartment into the container.

14 Claims, 3 Drawing Sheets

TOILET CONTROLS

RELATED APPLICATIONS

This application claims the benefit of the earlier filing date of U.S. Provisional Patent Application No. 61/873,072 filed Sep. 3, 2013. The disclosure in the aforementioned U.S. Provisional Patent Application No. 61/873,072 is hereby incorporated herein in its entirety by this reference thereto.

BACKGROUND OF THE INVENTION

The present invention relates to new and improved controls for use in association with a toilet.

Known toilets include a tank which holds a supply of water. When a handle is manually depressed, water flows from the tank through an outlet or valve into a toilet bowl. The flow of water into the tank is controlled by a float actuated inlet valve.

After a flow of water is conducted from the tank to a toilet bowl, the outlet valve is closed. This enables water to accumulate in the tank. If, for some unforeseen reason, the outlet valve remains or becomes stuck in an open condition or in a condition in which there is a substantial flow of water from the tank, the level of water in the tank will remain relatively low and the float actuated inlet valve will remain in an open condition. This may result in a substantial amount of water being wasted and/or in water damage.

Various control devices have been associated with the tank of a toilet. Some of these control devices are disclosed in U.S. Patent Application Publications No. 2001/0007158 and 2004/0199989. Other control devices are disclosed in U.S. Pat. Nos. 3,574,867; 3,722,850; 5,421,038; 5,862,537; 6,109,294; and 6,427,719.

SUMMARY OF THE INVENTION

The present invention relates to new and improved controls for use in association with a toilet. The controls enable water to be conserved by minimizing the amount of water lost in the event of either a minor leak or major leak at one or more components of the toilet.

The controls may be effective to actuate an inlet valve to a closed condition when the level of water in the tank of the toilet reaches a desired level. In addition, the controls may actuate the inlet valve to the closed condition when the level of water in the tank of the toilet remains below a desired level for a period of time after the toilet has been flushed.

If desired, a separate body of water may be maintained in a container in the tank. A float may be disposed in the container. If the outlet valve leaks, water will flow from the tank. However, since the float engages the separate body of water in the container, the water inlet valve will not open to replenish the water lost from the tank.

For some unforeseen reason, the water outlet valve from the tank may remain open after flushing of the toilet. Water accumulated in a compartment assembly is utilized to fill the container in the tank. The float in the container is then effective to actuate the water inlet valve to a closed condition even thought the tank of the toilet has not filled with water.

The toilet controls of the present invention have many different features. These features may be utilized together in the manner disclosed herein. Alternatively, the features may be utilized separately or in various combinations with each other and/or with features from the prior art.

BRIEF DESCRIPTION OF THE DRAWINGS

The foregoing and other features of the present invention will become more apparent upon a consideration of the following description taken in connection with the accompanying drawings wherein.

DESCRIPTION OF SPECIFIC PREFERRED EMBODIMENTS OF THE INVENTION

Figure 1:
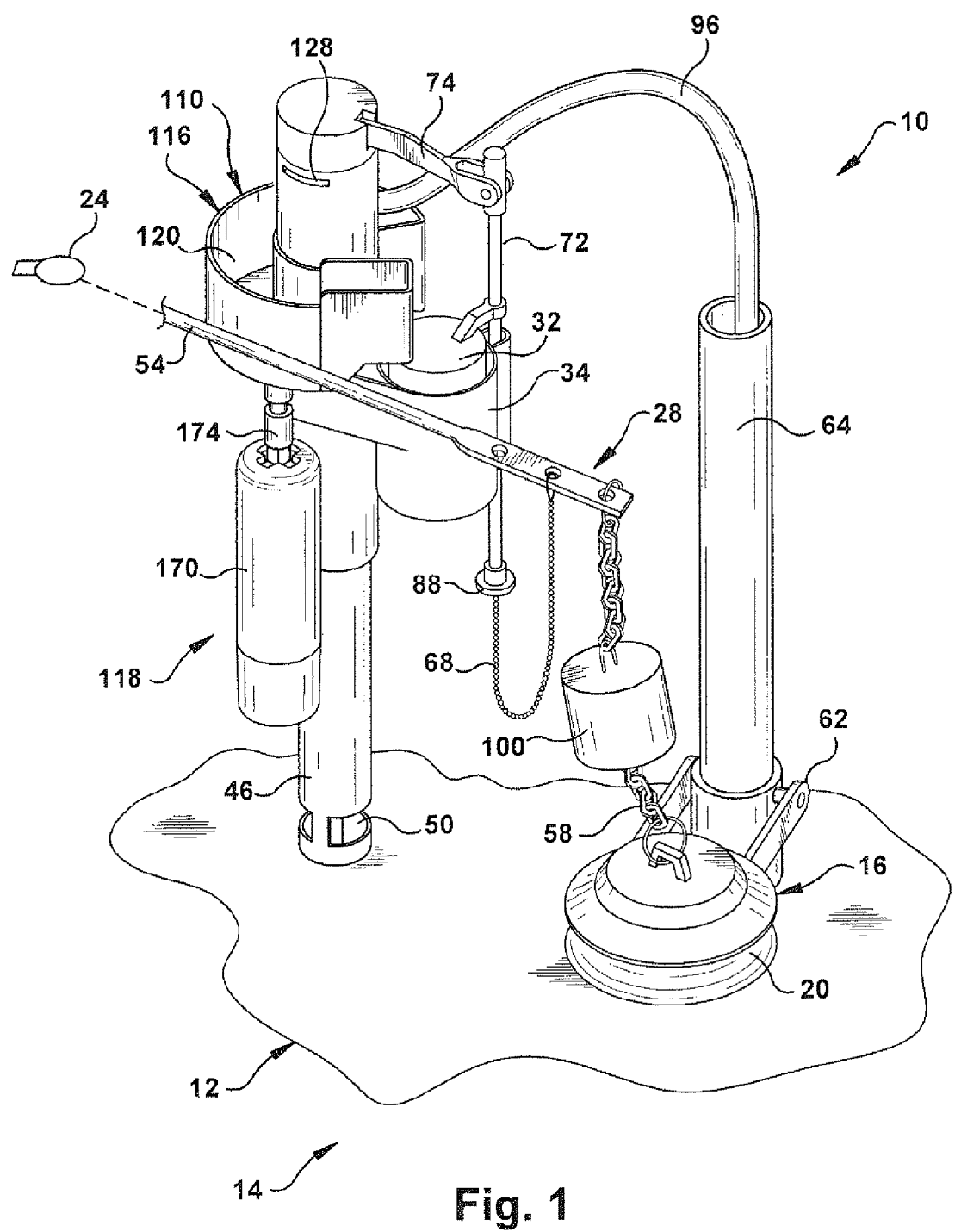
FIG. 1 is a fragmentary schematic illustration depicting the relationship of controls constructed in accordance with the present invention to a main tank of a toilet.

A toilet control apparatus 10, constructed in accordance with the present invention is illustrated in FIG. 1 in association with a main tank 12 of a toilet 14. The tank 12 is connected in fluid communication with a toilet bowl through an outlet valve 16. The outlet valve 16 is of the well known flapper type.

The outlet valve 16 is illustrated (FIG. 1) in a closed condition blocking the flow of water through an outlet opening 20. The toilet control apparatus 10 is operable, in response to manual actuation of a handle 24 mounted on the outside of the tank 12, to pivot the outlet valve 16 upwardly. This moves the outlet valve 16 from the closed condition of FIG. 1 to an open condition in which water flows from the main tank 12 through the outlet opening 20.

Upon manual actuation of the handle 24, a force transmitting assembly 28 transmits force from the handle 24 to the outlet valve 16 to pivot the outlet valve upwardly (as viewed in FIG. 1). This enables water to flow from the tank 12 into the bowl of the toilet through the outlet opening 20. This flow of water into the toilet bowl results in flushing of the toilet in a well known manner.

When the handle 24 is manually actuated, force is transmitted from the handle through the force transmitting assembly 28 to move a float 32 (FIG. 2) downwardly in a container 34. In the embodiment of the invention illustrated in FIG. 2, the float 32 is formed by a hollow cylinder having a closed upper end. However, the float 32 may be formed by a solid body of material which floats in water, such as expanded rigid polystyrene plastic (Styrofoam™). Alternatively, the float may be formed by a hollow cylinder which is closed at both ends.

As the cylindrical float 32 is pulled downwardly in the cylindrical container 34, water is expelled from the body of water 36 in the container into the tank 12 with a pumping action. At the same time, a water inlet valve 40 is actuated from a closed condition to an open condition. When the inlet valve 40 is open, water flows from a cylindrical water inlet pipe 42 (FIG. 2) into the tank 12.

When the inlet valve 40 is in the open condition, water is directed downwardly into a cylindrical sleeve 46 which extends around and is coaxial with the water inlet pipe 42. A large majority of the water from the inlet valve 40 flows downwardly along the cylindrical inner side surface of the sleeve 46 to openings 50 at the lower end of the sleeve. This results in the water flowing into the lower portion of the tank 12 to raise the level of water in the tank. The water may be conducted from the inlet valve 40 to the tank 12 in a different manner. For example, the water may flow directly from the inlet valve 40 into the tank 12. As another example, a hose or other conduit may be used to conduct water from the inlet valve 40 into the tank 12.

The force transmitting assembly 28 (FIG. 1) includes an actuator lever 54 which is pivotally mounted on the tank 12 and is fixedly connected to the handle 24. When the handle 24 is manually actuated, the actuator arm 54 is rotated with the handle about a pivot connection between the handle 24, actuator lever 54 and tank 12. The downward manual actuation of the handle 24 rotates the handle and the actuator arm 54 in a counterclockwise direction (as viewed in FIG. 1). Of course, the handle 24 may be mounted in a different manner if desired or an actuator other than a handle may be utilized.

This results in force being transmitted through a flexible chain 58 in the force transmitting assembly 28 to the outlet valve 16. The upper end of the chain 58 is connected with the outer end (right end as viewed in FIG. 1) of the actuator arm 54. The lower end of the chain 58 is connected with the outlet valve 16. When the handle 24 and actuator arm 54 are manually actuated, the chain 58 pulls the outlet valve 16 upwardly under the influence of force transmitted from the handle 24. This pivots the outlet valve 16 about a hinge type connection 62 at the lower end of a standpipe 64.

Figure 2:
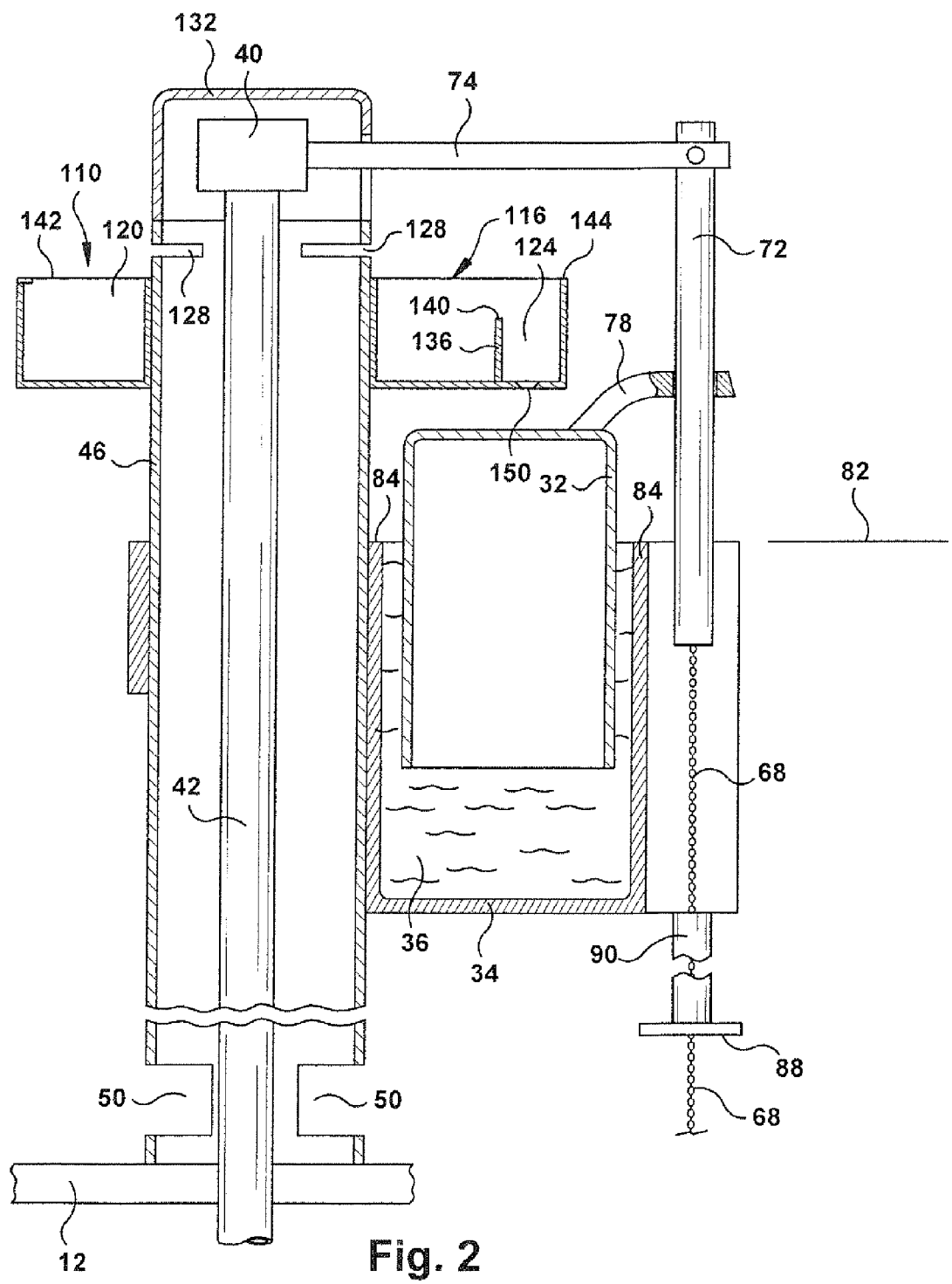
FIG. 2 is an enlarged fragmentary schematic sectional view depicting the relationship between some of the elements of the controls of FIG. 1.

In addition to being connected with the outlet valve 16, the actuator arm 54 is connected with the float 32 in the container 34 by a flexible line 68 in the force transmitting assembly 28. One end of the flexible line 68 is connected to the actuator arm 54 (see FIG. 1). The opposite end of the flexible line 68 is connected to a rod or shaft 72 (FIG. 2). The upper end of the shaft 72 is pivotally connected to an inlet valve actuator arm 74. The float 32 is fixedly connected with the shaft 72 by a connector arm 78 (FIG. 2) which extends between the float and the shaft 72. The connector arm 78 is fixedly connected to both the shaft 72 and float 32.

Prior to use of the toilet connected with the toilet control apparatus 10, the tank 12 is filled, to a desired level, with water to a line indicated schematically at 82 in FIG. 2. At this time, the desired level of water in the tank 12 is just slightly above (as viewed in FIG. 2) an edge or lip 84 of the container 34. Therefore, at this time, the container 34 is filled with water by the body 36 of water.

When a user manually pivots the handle 24, the actuator arm 54 is rotated upwardly (as viewed in FIG. 1) and the chain 58 pulls the outlet valve 16, under the influence of force transmitted from the handle 24, upwardly to open the outlet opening 20. This enables water to flow from the tank 12 into the bowl of the toilet.

At the same time, the flexible line 68 is pulled upwardly (as viewed in FIG. 1) by the actuator arm 54 under the influence of force transmitted from the handle 24. The force transmitted through the flexible line 68 pulls the shaft 72 and float 32 downward (as viewed in FIG. 2). The pulling of the shaft 72 and float 32 downward is facilitated by having the flexible line 68 extend through a smooth annular collar 88 (FIG. 2) formed on the lower end portion of a cylindrical tube 90 through which the flexible line extends.

As the actuator arm 54 is manually pivoted in a counter-clockwise direction (as viewed in FIG. 1), the flexible line 68 is pulled upwardly and around the flange on the collar 88 (FIG. 2) to pull the shaft 72 downward. Downward movement of the shaft 72 pivots the inlet valve actuator arm 74 in a clockwise direction (as viewed in FIG. 2) to open the inlet valve 40. At the same time, downward movement of the shaft 72 moves the float 32 downward in the container 34 under the influence of force transmitted from the shaft 72 through the connector arm 78 to the float 32.

Downward movement of the float 32 causes water to be forced from the container 34 with a pumping action. As the float 32 expels water from the container 34 with a pumping action, water is flowing at a relatively fast rate out of the tank 12 through the outlet opening 20. At this time, water is conducted from the inlet valve 40 through a hose 96 (FIG. 1) to a standpipe 64 and the bowl of the toilet in a known manner.

When the handle 24 is manually released, the outlet valve 16 may be held in an open condition for a short time by a float 100 (FIG. 1) connected with the chain 58. When the tank 12 has been substantially emptied of water, the outlet valve 16 will pivot to a closed position. At this time, the container 34 will be substantially empty of water and the float 32 will be on or close to the bottom of the container. Therefore, the inlet valve 40 remains in an open condition and water flows into the tank 12.

As water flows into the tank 12, the level of water in the tank will eventually reach the water line 82 (FIG. 2) and flow over the upper edge 84 of the container 34. This results in the container 34 being filled with water. As this occurs, the float 32 moves upward in the container 34 and pivots the inlet valve actuator arm 74 in a counter clockwise direction (as viewed in FIG. 2). As this occurs the inlet valve 40 closes. The inlet valve 40 closes under the influence of force transmitted from the float 32 through the connector arm 78, shaft 72 and actuator arm 74.

If a slow leak should occur at or near the outlet opening 20, water will slowly leak from the tank 12. However, water will not leak from the container 34. This results in the float 32 being maintained in the raised condition, illustrated in FIG. 2, so that the inlet valve 40 remains closed. Therefore, the only water which is lost through a slow leak will be from the tank 12. The inlet valve 40 will not open to contribute to the amount of water which leaks from the tank.

The manner in which the float 32 and container 34 cooperate to prevent the loss of water from the tank 12 in event of a slow leak is the same as is disclosed in U.S. Patent Publication No. 2009/0282610 A1 published Nov. 19, 2009, now U.S. Pat. No. 8,707,474. The disclosure in United States Patent Application Publication No. 2009/0282610 A1, now U.S. Pat. No. 8,707,474, is hereby incorporated herein in its entirety by this reference thereto.

In the event of a relatively large leak from the tank 12, the rate at which water leaks from the tank 12 may be greater than the rate at which water is supplied to the tank through the inlet valve 40. If this should happen, the level of water in the tank will never rise to the line 82 and water will not flow over the upper edge 84 of the container 34. Therefore, the float 32 will not raise the inlet valve actuator arm 74 and water will be continuously supplied to the tank 12 through the open inlet valve 40.

A relatively large flow of water from the tank 12 may occur if, for some unforeseen reason, the outlet valve 16 becomes jammed in an open condition. Alternatively, the relatively large rate of flow of water from the tank 12 may be the result of a breaking or cracking of the tank. Regardless of how or why the relatively large rate of leakage of water from the tank 12 occurs, the inlet valve actuator assembly 110 is effective to operate the inlet valve 40 to a closed condition. This results in the amount of water lost from the tank 12 due to the occurrence of a large leak from the tank being limited.

The float 32 and container 34 prevent a loss of more than one tank of water from the toilet when a small leak occurs. The inlet valve actuator assembly 110 prevents the loss of an excessive amount of water from the tank 12 in the event of a relatively large leak from the tank. Therefore, the toilet control apparatus 10 limits the amount of water lost from the tank 12 of a toilet in the event of either a relatively small or a relatively large leak from the tank.

Figure 3:
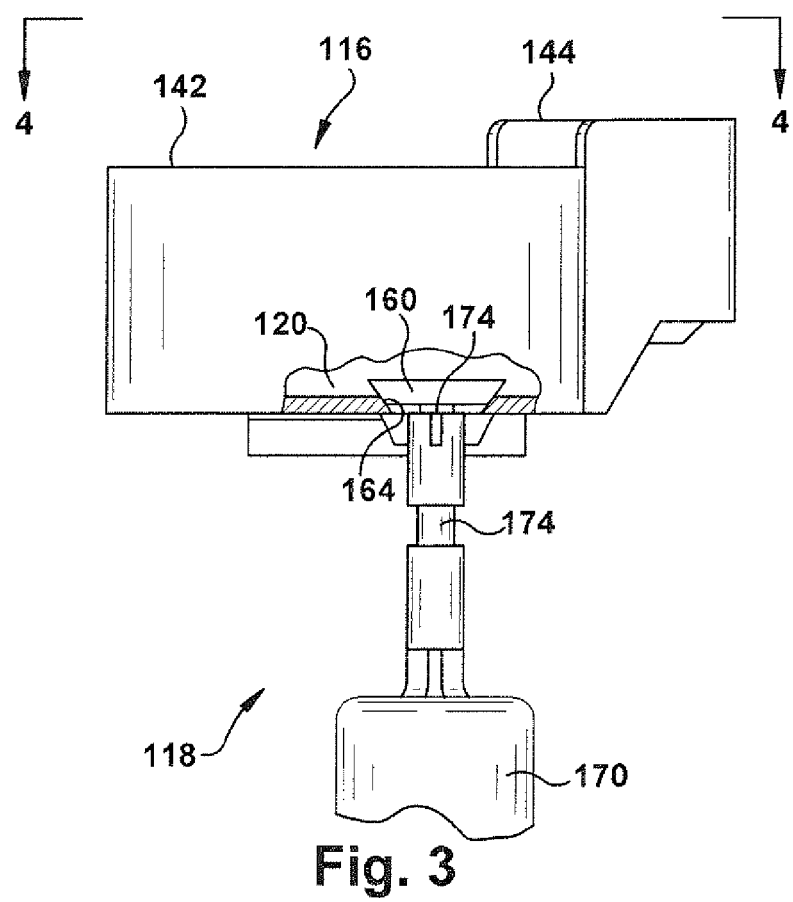
FIG. 3 is an enlarged fragmentary schematic illustration of a portion of a tank water level sensor apparatus utilized in the controls of FIG. 1 and depicting the relationship between a compartment assembly and a float which is operable to actuate a valve in the compartment assembly.
Figure 4:
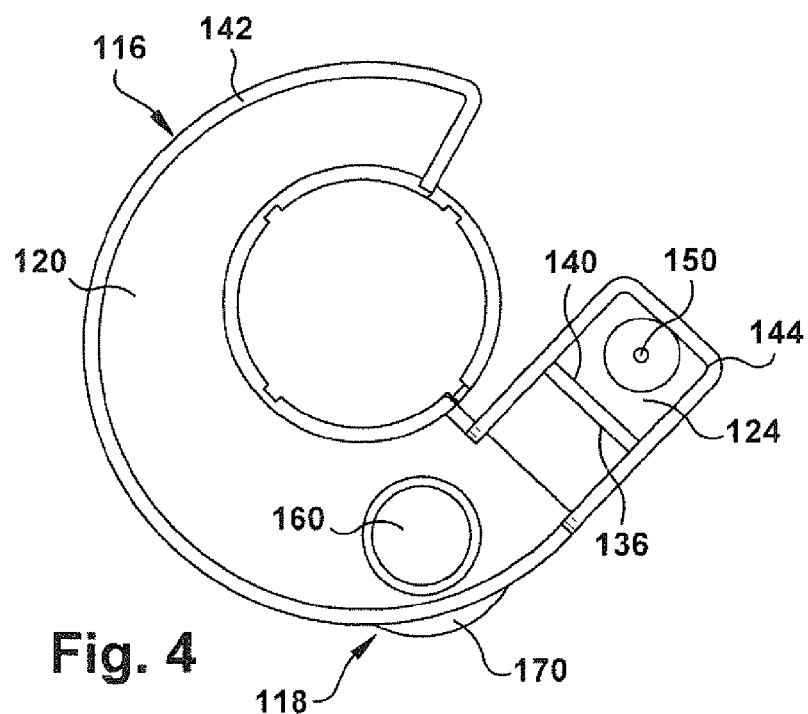
FIG. 4 is a schematic plan view, taken generally along the line 4-4 of FIG. 3, further illustrating the construction of the compartment assembly.

The inlet valve actuator assembly 110 (FIG. 1) includes a compartment assembly 116 and a tank water level sensor apparatus 118 (FIGS. 1, 3 and 4). The tank water level sensor apparatus 118 and compartment assembly 116 cooperate to at least partially fill the container 34 with water in the event of a relatively large leak of water from the tank 12. The tank water level sensor apparatus 118 and compartment assembly 116 cause the container 34 to be filled with water to a level which enables the float 32 to operate the inlet valve actuator assembly 110 and close the inlet valve 40. However, the tank water level sensor apparatus 118 and compartment assembly 116 are ineffective to fill the container 34 with water in the event of normal functioning of the toilet control apparatus or in the event of a slow leakage of water from the tank 12.

The compartment assembly 116 includes an inlet compartment 120 (FIGS. 2 and 4) and an outlet compartment 124. Although the illustrated embodiment of compartment assembly 116 includes only two compartments, that is, the large inlet compartment 120 and the small outlet compartment 124, it is contemplated that the compartment assembly 116 may include a greater or lesser number of compartments if desired. For example, the functions of the inlet and outlet compartments 120 and 124 may be combined into a single compartment. Alternatively, additional compartments and/or any sort of baffling system may be provided in association with the inlet compartment 120 and outlet compartment 124.

The stationary inlet compartment 120 extends around and is fixedly connected to the sleeve 46 (FIG. 2). The cylindrical sleeve 46 extends around and is fixedly connected to the water inlet pipe 42. Relatively small openings 128 are provided at an upper end portion of the sleeve 46, immediately above the compartment assembly 116. A lower end portion of the sleeve 46 is fixedly connected with the tank 12.

When the inlet valve 40 is operated from a closed condition to an open condition, water flows from the inlet valve 40 against inner side surfaces of the sleeve 46 and a circular cap 132 (FIG. 2) which is fixedly connected with the cylindrical sleeve 46. A portion of this water flows through the upper openings 128 into the inlet compartment 120. However, the large majority of the water from the inlet valve 40 is directed against inside of the cap 132 and the inside of the sleeve 46 and flows downward along the water inlet pipe through the relatively large openings 50 at the lower end of the sleeve. The water then flows from the openings 50 into the tank 12 to raise the level of water in the tank with a flow of water which enters the tank adjacent to a bottom wall of the tank.

The inlet compartment 120 in the compartment assembly 116 is separated from the relatively small outlet compartment 124 by a wall or weir 136 (FIGS. 2 and 4) which forms a dam between the inlet compartment 120 and outlet compartment 124. The wall 136 has a horizontal upper edge portion 140 which is disposed at a level below upper edge portions 142 and 144 (FIGS. 2 and 4) of the inlet compartment 120 and outlet compartment 124 (FIG. 2). When the inlet valve 40 is actuated to an open condition, water flows through the openings 128 into the inlet compartment 120. The wall 136 blocks flow of water from the inlet compartment 120 into the outlet compartment 124 until the level of water in the inlet compartment 120 rises to a level above the upper edge portion 140 of the wall 136 (FIG. 2).

When this occurs, the water flows from the inlet compartment 120 across the upper edge portion 140 of the wall 136 into the outlet compartment 124. If desired, the wall 136 may extend upward to the same level as the edge portions 142 and 144 of the inlet and outlet compartments 120 and 124. If this is done, an opening may be provided in the wall 136 to control flow of water from the inlet compartment 120 to the outlet compartment 124.

The outlet compartment 124 has a relatively small opening 150 (FIGS. 2 and 4) which is continuously open. Water can flow from the outlet compartment 120 through the opening 150. The opening 150 is disposed above the float 32. Therefore, water from the outlet compartment 124 flows through the opening 150 onto the upper side of the float 32. This water then flows downwardly along the outer sides of the float 32 into the container 34 to increase the volume of the body 36 of water in the container. If desired, the outlet compartment 124 may be eliminated and the opening 150 provided in the inlet compartment 120. If this is done, the opening 150 may be formed in a bottom and/or sidewall of the inlet compartment 120 at a location over the float 32 and/or container 34.

In the event of a relatively large leak of water from the tank 12, the rate of flow of water from the tank may be greater than the rate of flow of water from the open inlet valve 40. In this event, the upper surface of the body of water in the tank will not rise to the water line 82 and will not rise to a level above the upper edge (FIG. 2) of the container 34. Therefore, the container 34 will not be filled with water from the tank 12 and the float 32 will not be raised to shut off the inlet valve 40.

However, a portion of the flow of water from the inlet valve 40 will be conducted through the relatively small upper openings 128 into the inlet compartment 120. This flow of water will cause the level of water in the inlet compartment 120 to rise. As the upper surface of the body of water in the inlet compartment 120 moves upward above the upper edge portion 140 of the wall 136 (FIG. 2), the water will flow from the inlet compartment 120 into the outlet compartment 124.

The water will then flow from the outlet compartment 124 through the opening 150. This water flows across the upper side of the float 32 and into the container 34. As water accumulates in the container 34, the float 32 will move upwardly.

Force transmitted from the float 32 through the connector 78 to the arm shaft 72 (FIG. 2) will raise the inlet valve actuator arm 74 to close the inlet valve 40. Thus, in the event of the occurrence of a relatively large leak of water from the tank 12, water will accumulate in the inlet compartment 120, flow into the outlet compartment 124, and then flow from the outlet compartment into the container 34 to raise the float 32 and close the inlet valve 40.

In the embodiment of FIGS. 1-4, water is conducted to the inlet compartment 120 through the upper openings 128 (FIG. 2) in the sleeve 46. However, it is contemplated that water may be conducted to the inlet compartment 120 in a different manner. For example, water may be conducted directly from the inlet valve 40 to the inlet compartment 120. As another example, water may be conducted from the hose 96 (FIG. 1) to the inlet compartment 120. If this is done, a conduit may extend from a valve or flow control orifice connected with the hose 96 to the inlet compartment 120.

In the absence of a relatively large leak of water from the tank during a flushing of a toilet having the toilet control apparatus 10, the inlet compartment 120 is emptied of water by the tank water level sensor apparatus 118 (FIG. 1) before the level of water in the inlet compartment rises to a level above the upper edge portion 140 of the wall 136 (FIG. 2). To empty the inlet compartment 120, a control valve 160 (FIGS. 3 and 4) in the tank water level sensor apparatus 118 is actuated to an open condition. Opening of the control valve 160 enables water to flow from the inlet compartment 120 through an opening 164 (FIG. 3) into a body of water contained in the tank 12. During normal operating conditions or a small leak condition, the valve 160 is opened before the level of water in the inlet compartment 120 has reached a height sufficient to enable water to flow over the upper edge portion 140 of the wall 136 (FIG. 2).

The tank water level sensing apparatus 118 (FIGS. 1 and 3) includes a float 170 which is connected with the valve 160 (FIG. 3) by a stem 174. When the water level in the tank 12 (FIG. 1) reaches a sufficient height, the float 170 is moved upward with the upper surface of the body of water in the tank. This results in the valve 160 being moved to an open position in which water can flow from the inlet compartment 120 through the opening 164.

Prior to upward movement of the float 170 and valve 160, the weight of the float holds the valve firmly against movement relative to the opening 164 (FIG. 3). At this time the valve 160 blocks a flow of water through the opening 164. As the tank 12 fills during normal operation of the toilet, the upper surface of the body of water in the tank 12 will rise to the water line 82 (FIG. 2). At this time, the container 34 will be filled by the body 36 of water. The float 32 will be in the raised position illustrated in FIG. 2, holding the inlet valve 40 closed.

When the tank 12 is filled to the water line 82 (FIG. 2), the float 170 in the water level sensor apparatus 118 (FIG. 3) will have moved the valve 160 upwardly from the closed position illustrated in FIG. 3 to an open position in which the valve is ineffective to block a flow of water through the opening 164. Therefore, the inlet compartment 120 in the compartment assembly 116 is empty and any water which had previously accumulated in the inlet compartment 120 will have drained into the body of water contained in the tank 12. Of course any water which was previously in the outlet compartment 124 will have drained through the opening 150. Therefore, both of the compartments 120 and 124 will be empty.

When the toilet in which the toilet control apparatus 10 is used is to be flushed, the handle 24 is manually grasped and rotated. This results in force being transmitted from the handle 24 through the force transmitting assembly 28 to open the outlet valve 16 and to pull the float 32 downward in the container 34. This operates the inlet valve 40 to an open condition. As the float 32 moves downward in the container 34, water is expelled from the container with a pumping action.

This results in a substantial flow of water through the open outlet valve 16 and the outlet opening 20 into the bowl of the toilet. At the same time, the inlet valve 40 is directing a flow of water into the inside of the sleeve 46. As this occurs, there is a flow of water through the relatively small upper outlet openings 128 (FIG. 2) in the sleeve 46 into the inlet compartment 120 of the compartment assembly 116. However, the majority of the water from the inlet valve 40 flows through the relatively large outlet openings 50 at the lower end of the sleeve 46.

Immediately after the water has been emptied from the tank 12, the handle 24 is manually released and the outlet valve 16 closes. This results in water accumulating in the tank. Assuming the normal operation of the toilet control apparatus 10, as water accumulates in the tank 12, the float 170 in the water level sensor apparatus 118 will be moved upwardly (as viewed in FIGS. 1 and 3) to open the valve 160 and empty the inlet compartment 120 of the compartment assembly 116.

As water continues to accumulate in the tank 12, the level of the upper surface of the water will approach the water line 82 (FIG. 2). As this occurs, water will flow over the upper edge 84 of the container 34. The accumulation of water in the container 34 will result in the float 32 being raised to actuate the inlet valve 40 to a closed condition under the influence of force transmitted through the shaft 72 and inlet valve actuator arm 74 (FIG. 2).

Assuming that there is small leak from the tank 12, water will slowly leak from the tank. With the passage of time, almost all of the water will be emptied from the tank. However, the inlet valve 40 will remain closed. This is because the container 34 will continue to hold the body of water 36. Therefore, the float 32 is effective to hold the shaft 72 and inlet valve actuator arm 74 upwardly in the position illustrated schematically in FIG. 2 to maintain the inlet valve closed. Therefore, only the water contained in the tank 12 is lost due to the small leak.

It is contemplated that, for unforeseen reasons, a relatively large leak may be established during operation of the toilet control apparatus 10. This large leak may, for example, be due to a jamming of the outlet valve 16 in an open position. In the event that this occurs, water will not accumulate in the tank 12. The float 32 will remain in the lowered position illustrated in FIG. 1 in which the container 34 is substantially empty and the inlet valve 40 is in an open condition.

The compartment assembly 116 (FIG. 1) cooperates with the container 34 and float 32 to prevent an excessive loss of water from the tank 12 under these circumstances. As the inlet valve 40 remains open and the outlet valve 16 remains jammed in an open condition, water from the inlet valve will flow along the inside of the sleeve 46 through the openings 128 into the inlet compartment 120. As this occurs, the level of water in the inlet compartment will gradually approach the upper edge portion 140 of the wall 136 (FIG. 2). At this time, the valve 160 (FIG. 3) will be in the closed condition illustrated in FIG. 3 blocking a flow of water from the inlet compartment 120. This is because sufficient water will not have accumulated in the tank 12 to enable the float 170 to open the valve 160.

As the water accumulates in the inlet compartment 120, the water will flow over the upper edge portion 140 (FIG. 2) of the wall 136 into the outlet compartment 124. Water will flow from the outlet compartment 124 through the opening 150 (FIG. 4) onto the upper end of the float 32 (FIG. 2) and into the container 34. This results in the accumulation of a body of water in the container 34 of sufficient magnitude to raise the float 32 to actuate the inlet valve 40 to a closed condition. Therefore, in the event of a relatively large leakage of water from the tank 12, the volume of water lost will be limited to the volume of water which is lost during the time in which the inlet compartment fills up and overflows into the outlet compartment 124 and fills the container 34.

In view of the foregoing description, it is apparent that the present invention relates to new and improved controls 10 for use in association with a toilet. The controls 10 enable water to be conserved by minimizing the amount of water lost in the event of either a minor leak or major leak at one or more components of the toilet.

The controls 10 may be effective to actuate an inlet valve 40 to a closed condition when the level of water in the tank 12 of the toilet reaches a desired level, indicated by the water line 82 in FIG. 2. In addition, the controls 10 may actuate the inlet valve 40 to the closed condition when the level of water in the tank of the toilet remains below a desired level for a period of time after the toilet has been flushed.

If desired, a separate body 36 of water may be maintained in a container 34 in the tank 12. A float 32 may be disposed in the container 34. If the outlet valve 16 leaks, water will flow from the tank 12. However, since the float 32 engages the separate body 36 of water in the container 34, the water inlet valve 40 will not open to replenish the water lost from the tank 12.

For some unforeseen reason, the water outlet valve 16 from the tank 12 may remain open after flushing of the toilet. Water accumulated in a compartment assembly 116 is utilized to fill the container 34 in the tank 12. The float 32 in the container 34 is then effective to actuate the water inlet valve 40 to a closed condition even thought the tank 12 of the toilet has not filled with water.

Having described the invention, the following is claimed:

1. A toilet comprising a main tank which is connected with a toilet bowl, an inlet valve which is operable to an open condition to enable water to flow into said main tank and is operable to a closed condition to block a flow of water into said main tank, an outlet valve which is operable to an open condition to enable water to flow from said main tank into the toilet bowl and is operable to a closed condition to at least partially block a flow of water from said main tank into the toilet bowl, a container which is disposed in said main tank and holds a body of water, a float which is at least partially disposed in said container and is connected with said inlet valve, said float being movable from a first position in said container to a second position in said container, said container contains a first quantity of water when said float is in the first position, said container contains a second quantity of water when said float is in the second position, said second quantity of water is less than said first quantity of water, said float being movable from the second position in said container to the first position in said container to effect operation of said inlet valve from the open condition to the closed condition in response to accumulation of water in said container, an inlet compartment into which water flows when said inlet valve is in the open condition, and an outlet compartment into which water flows after a predetermined quantity of water has accumulated in said inlet compartment and from which water flows into said container when the inlet valve is in the open condition and the main tank is prevented from accumulating a predetermined quantity of water.

2. A toilet comprising a main tank which is connected with a toilet bowl, an inlet valve which is operable to an open condition to enable water to flow into said main tank and is operable to a closed condition to block a flow of water into said main tank, an outlet valve which is operable to an open condition to enable water to flow from said main tank into the toilet bowl and is operable to a closed condition to at least partially block a flow of water from said main tank into the toilet bowl, a container which is disposed in said main tank and holds a body of water, a float which is at least partially disposed in said container and is connected with said inlet valve, said float being movable from a first position in said container to a second position in said container, said container contains a first quantity of water when said float is in the first position, said container contains a second quantity of water when said float is in the second position, said second quantity of water is less than said first quantity of water, said float being movable from the second position in said container to the first position in said container to effect operation of said inlet valve from the open condition to the closed condition in response to accumulation of water in said container, an inlet compartment into which water flows when said inlet valve is in the open condition, an outlet compartment into which water flows after a predetermined quantity of water has accumulated in said inlet compartment and from which water flows into said container, and a control valve operable from a closed condition blocking a flow of water through an outlet from said inlet compartment to an open condition enabling water to flow from said inlet compartment through said outlet from said inlet compartment upon accumulation of a predetermined quantity of water in the main tank.

3. A toilet as set forth in claim 2 further including a control float connected with the control valve and extending into the tank, the control float moving the control valve from the closed condition to the open condition in response to movement of an upper surface of a body of water in the main tank to at least a predetermined level.

4. A toilet as set forth in claim 1 wherein the outlet compartment is at least partially disposed above said container to enable water to flow from said outlet compartment into said container under the influence of gravity.

5. A toilet as set forth in claim 1 wherein said outlet compartment has an opening disposed above said float to enable water to flow through said opening onto said float.

6. A toilet as set forth in claim 1 further including a handle which is movably mounted on said main tank and is manually actuatable from outside of said main tank, and a force transmission assembly connected with said handle and with said outlet valve and said float, said float being movable from the first position to the second position under the influence of force transmitted from said handle to said float to induce a flow of water from said container.

7. A toilet as set forth in claim 1 further including a wall separating the inlet compartment from the outlet compartment, the wall preventing water from flowing into the outlet compartment from the inlet compartment until the predetermined quantity of water has accumulated in the inlet compartment.

8. A toilet as set forth in claim 7 further including a control valve operable from a closed condition blocking a flow of water through an outlet from the inlet compartment to an open condition enabling water to flow from the inlet compartment through the outlet from the inlet compartment upon accumulation of a predetermined quantity of water in the main tank.

9. A toilet comprising a main tank which is connected with a toilet bowl, an inlet valve which is operable to an open condition to enable water to flow into said main tank and is operable to a closed condition to block a flow of water into said main tank, an outlet valve which is operable to an open condition to enable water to flow from said main tank into the toilet bowl and is operable to a closed condition to at least partially block a flow of water from said main tank into the toilet bowl, an inlet compartment into which water flows when said inlet valve is in the open condition, a control valve movable between a closed condition blocking a flow of water through an outlet from said inlet compartment and an open condition enabling water to flow through said outlet from said inlet compartment, a control float connected with said control valve and extending into said main tank, said control float being movable relative to said main tank by water in said main tank to move said control valve from the closed condition to the open condition in response to movement of an upper surface of a body of water in said main tank to at least a predetermined level, an outlet compartment into which water is conducted from said inlet compartment when said control valve is in the closed condition and a predetermined quantity of water has accumulated in said inlet compartment, said outlet compartment having a bottom wall with an opening which is continuously maintained in an open condition to enable water to flow from said outlet compartment.

10. A toilet as set forth in claim 9 further including a container which is disposed in the tank and holds a body of water and a float at least partially disposed in the container and connected with the inlet valve, the float being movable from a first position in the container to a second position in the container, the container containing a first quantity of water when the float is in the first position, the container containing a second quantity of water when the float is in the second position, the second quantity of water being less than the first quantity of water, the float being movable from the second position in the container to the first position in the container to effect operation of the inlet valve from the open condition to the closed condition in response to accumulation of water in the container, water flowing from the outlet compartment into the container through the opening after the predetermined quantity of water has accumulated in the inlet compartment.

11. A toilet as set forth in claim 10 wherein the outlet compartment is at least partially disposed above the container to enable water to flow from the outlet compartment into the container under the influence of gravity.

12. A toilet as set forth in claim 10 wherein the opening in the outlet compartment is disposed above the float to enable water to flow through the opening onto the float.

13. A toilet as set forth in claim 10 further including a handle which is movably mounted on the tank and is manually actuatable from outside of the tank, and a force transmission assembly connected with the handle and with the outlet valve and the float, the float being movable from the first position to the second position under the influence of force transmitted from the handle to the float to induce a flow of water from the container.

14. A toilet as set forth in claim 9 further including a wall separating the inlet compartment from the outlet compartment, the wall preventing water from flowing into the outlet compartment from the inlet compartment until the predetermined quantity of water has accumulated in the inlet compartment.

* * * * *